United States Patent [19]

Young

[11] Patent Number: 5,486,295

[45] Date of Patent: Jan. 23, 1996

[54] METHOD FOR TREATING POLYMER-CONTAINING WATERS TO ALLOW USE AS COOLING TOWER MAKEUP

[75] Inventor: Paul R. Young, Wheaton, Ill.

[73] Assignee: Nalco Chemical Company, Naperville, Ill.

[21] Appl. No.: 354,389

[22] Filed: Dec. 12, 1994

[51] Int. Cl.⁶ .................................................. C02F 5/12
[52] U.S. Cl. ........................... 210/701; 210/698; 252/180
[58] Field of Search .................................. 210/696–701; 252/180, 181

[56] References Cited

U.S. PATENT DOCUMENTS

| | | | |
|---|---|---|---|
| 3,756,257 | 9/1973 | Rice et al. | 134/3 |
| 3,836,461 | 9/1974 | Whitehead et al. | 210/712 |
| 4,285,302 | 8/1981 | Kelly | 122/382 |
| 4,457,847 | 7/1984 | Lorenc et al. | 210/698 |
| 4,968,431 | 11/1990 | Bohnsack et al. | 210/669 |

*Primary Examiner*—Peter A. Hruskoci
*Attorney, Agent, or Firm*—Robert A. Miller; James J. Drake

[57] ABSTRACT

Industrial waters treated with water soluble polymers can be satisfactorily recycled into systems containing hardness causing cations by treating the water containing the polymer with a water soluble persulfate salt. Treated waters may be added, for example, into a recirculating cooling water system, saving makeup water, and decreasing the load placed on industrial plant waste water systems.

11 Claims, No Drawings

METHOD FOR TREATING POLYMER-CONTAINING WATERS TO ALLOW USE AS COOLING TOWER MAKEUP

BACKGROUND OF THE INVENTION

This invention relates to a method for the treatment of a water source containing water soluble polymers, especially boiler blowdown water, so as to allow the polymer containing water to be satisfactorily recycled into a recirculating cooling water system.

The use of water soluble polymeric treatment chemicals as additives to prevent scale and provide corrosion control in aqueous systems, and to disperse solids, especially in boiler water systems has gained rapid success. One of the typical components of this type of treatment is a water soluble polymer, typically a polymer or copolymer of acrylic acid or methacrylic acid, which is used to sequester hardness or scale forming cations contained in the water in the system. The additives, by effectively sequestering hardness contained in the system, prevent the deposition of hardness containing scale from the water onto the heat transfer surfaces of the aqueous system, generally a boiler water system. One of the drawbacks of such a system, is that the polymer must be present in the system in excess of the total amount of hardness present in the water. This is specifically taught in U.S. Pat. No. 4,457,847 where it is taught to treat boiler water with from 1–30 parts of polymer for each part of hardness present.

While this type of treatment maintains soluble alkaline earth metal ions in solution in boiler waters containing relatively low levels of hardness, during the usage of these boiler waters, impurities are concentrated, and as a result, most boilers discharge a portion of the concentrated impurities, along with boiler water, as boiler water blowdown. The amount of water contained in boiler water blowdown can be substantial in large boilers, and while unsuitable for further use as boiler feed water without further treatment, this water is often of a higher quality than normal, untreated feedwater. If the boiler generating the blowdown was treated with a water soluble vinyl addition polymer scale inhibitor, the addition of this untreated blowdown to a recirculating cooling water system containing water having greater than about 100ppm of hardness (calculated as CaCO3 and including scale forming cations such as calcium and/or magnesium) can result in massive quantities of undesirable polymer scale formation on the heat transfer surfaces of the recirculating water system.

The scale forming material, which is believed to be calcium or magnesium acrylate salts, fouls the heat exchange surfaces of recirculating water systems leading to the necessity to shut the system down in order to clean heat transfer surfaces and restore efficiency.

The problems associated with the use of polymer containing boiler water blowdown has prevented the widespread recycling of boiler water blowdown into recirculating cooling water systems, and as a result, large quantities of water, which while otherwise recyclable have had to have been discharged into plant waste treatment systems. This invention is directed to a method for the treatment of water, and particularly boiler water blowdown containing water soluble polymeric scale inhibitors and the like. Treatment of such waters using the method of this invention, allows the efficient and economical recycle and reuse of polymer containing waters into recirculating cooling water systems. The invention accordingly can result in substantial make-up water savings for operators of recirculating cooling water systems, while at the same time lessen the load on industrial waste water treatment facilities. By the use of the method of the present invention, the formation of polymer scale caused by the formation of alkaline earth acrylate salts on the interior surfaces of recirculating cooling water systems can be virtually eliminated.

THE INVENTION

The basic process of this invention allows the recycle of waters containing water soluble polymers, especially boiler water blowdown, to a recirculating cooling water system, which process comprises the steps of:

a) adding to the water containing the water soluble polymer from 0.01 to 10 parts by weight of a water soluble persulfate salt per each part by weight of polymer contained in the water;

b) reacting the persulfate salt with the water soluble polymer contained in the water for a sufficient period of time to reduce the molecular weight of the water soluble polymer; and then, c) adding the water to a recirculating cooling water system having a hardness of at least 100ppm calculated as $CaCO_3$.

The invention is especially beneficial in the treatment of boiler water blowdown containing polymeric scale control agents.

Boiler water is generally of a much higher purity than that employed in the operation of recirculating cooling water systems. Typically, high pressure, high temperature boilers operate with boiler feed water that has been ion-exchanged to remove alkali and alkaline earth metal salts, and is generally deaerated and/or treated with oxygen scavengers to remove oxygen gas dissolved in the water which could react with the boiler water system metallurgy to form corrosion products. Boiler feed water for less critical systems is also often treated to remove some or all of the soluble hardness. No matter how boiler water is treated, some hardness, even very low levels remains in the feed water and enters the boiler system. In order to prevent the precipitation of calcium or magnesium salts on the critical heat exchange areas of a boiler, typically such systems have been treated with scale and/or corrosion inhibitors. One such treatment method involved the addition of orthophosphate ions into the boiler water. This resulted in the precipitation or calcium phosphate materials, which formed a precipitate, and the movement of the precipitate to the boiler mud drum where such precipitate was collected and eventually removed.

Later technology involved the use of chelating agents such as ethylenediaminetetraacetic acid, and its salts(EDTA) or nitrilotriacetic acetic acid or its salts (NTA) to complex soluble hardness ions, and hold them in solution. More recent technology employs the use of water soluble polymers, most notably, acrylates such as those exemplified in U.S. Pat. No. 4,457,847, the specification of which is hereinafter incorporated by reference into this specification. Other possible reasons for adding water soluble polymers to aqueous systems include their use as dispersants for solids or colloidal materials present in the water, deflocculants, friction reducers, and other known methods. It is not important why the polymer was added to the aqueous system to be treated in accordance with this invention.

While successful in controlling the formation of scale on the interiors of boiler water systems, the polymers when properly employed are generally added to a boiler water on a weight basis in excess to the hardness causing cations contained in the boiler water. When boiler water is blown down to eliminate the buildup of concentrated scale forming constituents, and this boiler water blowdown is added to water containing scale forming cations such as those normally encountered in recirculating cooling systems, the polymer present in the blowdown is generally no longer present in excess to the hardness contained in the water, with the result that deposits of calcium, or magnesium acrylate materials are formed. It is the formation of these deposits which have led to the discharge of the majority of boiler water blowdown, rather than recycling.

Various techniques have been tried to recycle boiler water blowdown. Among the techniques contemplated include ion-exchange to remove hardness or scale causing cations, reverse osmosis, and the like, but all method have proven to be too expensive and capital intensive to be of practical use. Surprisingly, I have found that when water soluble persulfate salts are added to boiler water blowdown containing water soluble polymer materials before addition of the water to a recirculating cooling water system, scaling problems due to the formation of polymer scale are avoided.

The persulfates that may be used in the course of the subject invention include commonly available water soluble persulfate salts such as sodium, potassium, and ammonium persulfate. These materials may be added to the boiler water blowdown in the form of an aqueous solution, or as a solid, since the solid persulfate materials will rapidly dissolve in the boiler water blowdown. When the boiler water blowdown is reacted with the persulfate salts, generally at temperatures of from about at least 80°–150° C., temperatures at or lower than the temperatures at which boiler water blowdown is normally discharged, the persulfate is believed to react with the water soluble polymeric scale control agents contained in the boiler water blowdown, lowering their molecular weight. While the addition of the water soluble persulfate salt is generally done at boiler operating temperatures, I do not believe that the temperature used to react the polymer with the persulfate is critical. The resultant treated water contains water soluble polymers of lower molecular weight than the polymeric scale control agents originally contained in the boiler water blowdown, with the benefit that the alkaline earth metal salts of these lower molecular weight polymer salts have greater solubility, and thus the formation of polymer scale within the recirculating cooling water system is avoided when such waters are added to such system.

The addition of a soluble persulfate salt to the water containing the polymeric scale control agent may be made to the water prior to its addition into the cooling water system. In a preferred practice of the invention it is desirable to add the persulfate material to the water containing the water soluble polymer prior to the addition of such water to a recirculating cooling system. In a typical system which is envisioned to use the process of the subject invention, the persulfate salt is added to water containing the water soluble polymer which is maintained at a temperature of from 80°–150° C. in a holding tank, or other vessel for a sufficient period of time, generally ranging from several seconds to as long as several hours. In a preferred embodiment, temperature is maintained in the range of from about 100°–150° C. for a period of about 30 seconds to about 30 minutes. Generally time periods as short as 2–15 minutes appear to give satisfactory results. The exact time necessary for treatment may be readily determined by analyzing the molecular weight of the polymer contained in the water prior to treatment, and noting the molecular weight after treatment. Generally, the molecular weights of the starting polymer treatment agents range from as little as several thousand to about 100,000. After treatment, molecular weight determinations indicate a reduction in molecular weight to anywhere from about 2,000 to about 10,000. While, as stated above, temperatures of a normal boiler system are generally used, temperature is not believed to be a critical factor in the performance of this invention.

In typical usage, a ratio of from as little as 0.1 part of persulfate salt to 1 part polymer to as much as 10 parts of persulfate salt are is added per each part of polymer contained in the water. Preferably, 1 part of persulfate is added per each 1 to 4 parts of polymer contained in the water, and most preferably, 1 part of persulfate is added for each 1 to 2 parts of polymer contained in the polymer containing water to be treated.

In order to exemplify the invention claimed herein, the following examples were conducted.

EXAMPLES

Example A

Boiler blowdown was collected from a small laboratory research boiler, operating at 600 PSI. The boiler water blowdown contained 143 ppm polymer actives of a commercially available acrylate containing boiler water scale control agent. This polymer is available from Nalco Chemical Company under the tradename Nalco (r) Transport-plus (r) 7200. Addition of 200ppm Ca to an aliquot of the boiler water blowdown caused the solution to become turbid at room temperature. Heating to 35° C. made turbidity worse.

This boiler water blowdown, without treatment, was added to a Pilot Cooling Tower operating at 400ppm Ca and 120° F. Heavy scale formed on the heat exchange surfaces of the pilot cooling tower.

Portions of this boiler water blowdown were then treated with various levels of sodium persulfate solution under the conditions noted in Table 1 below. After treatment, turbidity at room temperature and at 35° C. were eliminated. Temperature measurements were taken to determine the temperature at which turbidity occurred (column 8, Table 1 headed "Temp °C."). Results are more fully detailed in Table I.

More importantly, when the boiler water blowdown after treatment was added to a pilot cooling tower being operated under the conditions noted above, very little scale was observed. Heat transfer resistance (HTR) measurements showed much smaller increases than with untreated boiler water blowdown. The results showed that a treatment ratio of persulfate to polymer of 1:2 gives very good results, and as low as 1:4 gives measurable improvement.

TABLE I

| Expt | ppm Persulfate | Temp (°C.) | pH(i) | pH(fin) | ppm Polymer | Time (min) | Temp (°C.) | 35° C. Turbidity |
|---|---|---|---|---|---|---|---|---|
| 1 | 0 | 25 | 10.69 | 10.69 | 143 | 0 | >20 | 25 |
| 2 | 19 | 127 | 10.69 | 10.27 | 143 | 4 | 45 | 1 |
| 3 | 35 | 127 | 10.69 | 10.23 | 143 | 1.9 | 55 | 0 |
| 4 | 36 | 127 | 10.69 | 10.27 | 143 | 11 | 55 | 0 |
| 5 | 43 | 127 | 10.69 | — | 143 | 3.3 | 60 | 1 |
| 6 | 54 | 127 | 10.69 | — | 143 | 11 | 60 | 1 |
| 7 | 72 | 127 | 10.69 | 9.87 | 143 | 2 | 60 | 1 |
| 8 | 72 | 127 | 10.69 | 9.87 | 143 | 4 | 65 | 0 |

EXAMPLE B

Blowdown from 250 PSI industrial boiler was collected. It contained 13 ppm actives of a commercially available methacrylate-type scale control polymer. The low polymer content made it difficult to see turbidity when calcium was added, however, there was noticeable turbidity at 35° C. When this boiler water blowdown was added to a pilot cooling tower, heavy scaling occurred.

Treatment of this boiler water blowdown with 11–44 ppm sodium persulfate eliminated the turbidity at 35° C. (Table 2). When treated boiler water blowdown was added to a pilot cooling tower, essentially no scale was observed. The proportion of boiler water blowdown in the cooling water contained in the pilot cooling tower was increased twice. Also, a different source of boiler water blowdown was used which had a higher level of polymer (Table 2, Expt. 18–23). Only when the polymer concentration in the cooling tower became excessive did significant scale form.

Results again show that the use of water soluble persulfate salts to treat water containing water soluble polymeric scale inhibitors renders the water useful as recyclable feed to systems containing hardness.

TABLE 2

| Expt | ppm Persulfate | Temp (°C.) | pH(i) | pH(fin) | ppm Polymer | Time (min) | Temp (°C.) | 35° C. Turbidity |
|---|---|---|---|---|---|---|---|---|
| 9 | 0 | 127 | 11.07 | 11.07 | 13.2 | 6.6 | 35 | |
| 10 | 22.5 | 127 | 11.07 | 10.99 | 13.2 | 6.6 | 95 | |
| 11 | 21 | 127 | 11.07 | 10.94 | 13.2 | 3.2 | 95 | |
| 12 | 11.1 | 127 | 11.07 | 10.96 | 13.2 | 3.2 | 80 | |
| 13 | 19.5 | 127 | 11.07 | | 13.2 | 3 | | |
| 14 | 11.9 | 127 | 11.07 | | 13.2 | 1.8 | | |
| 15 | 44.1 | 127 | 11.07 | 10.8 | 13.2 | 3.4 | | |
| 16 | 20.4 | 127 | 11.07 | | 13.2 | 3.2 | | |
| 17 | 21.4 | 127 | 11.07 | | 13.2 | 3.3 | 75 | |
| 18 | 0 | 127 | 11.26 | 11.26 | 32 | 0 | 40 | |
| 19 | 58 | 127 | 11.26 | | 32 | 4.4 | | |
| 20 | 41 | 127 | 11.26 | 11.23 | 32 | 4.4 | 60 | |
| 21 | 0 | 100 | 10.98 | | 56 | 30 | 40 | 11 |
| 22 | 150[1] | 95 | 10.8 | 8 | 58 | 30 | | |
| 23 | 150 | 100 | 10.98 | 9.73 | 56 | 30 | 65 | 1 |

[1] ammonium persulfate, all other runs sodium persulfate

In the Pilot Cooling Tower tests described in 1 and 2, deposit weight on stainless steel heat exchange tubes was measured. With untreated boiler water blowdown, the deposit totaled 211 mg. With treated boiler water blowdown (even with some episodes of scaling as mentioned above), the deposit weight was only 17 mg. This confirms that scaling is greatly reduced if the boiler water blowdown is pretreated with persulfate.

Having thus shown the surprising utility of the process of this invention, I claim:

1. A method for recycling boiler blowdown water containing a water soluble polymer which forms deposits on heat transfer surfaces when said water is added to a recirculating cooling water system, the water in said cooling water system containing at least 100 ppm of hardness calculated as $CaCO_3$, which comprises the steps of:

a) adding to the boiler blowdown water containing the water soluble polymer from 0.01 to 10 parts by weight of a water soluble persulfate salt per each part by weight of polymer contained in the water;

b) reacting the persulfate salt with the water soluble polymer contained in the water for a sufficient period of time to reduce the molecular weight of the water soluble polymer; and then, c) adding the water to said recirculating cooling water system wherein the amount of deposit formed on the heat transfer surfaces of the recirculating cooling water system is reduced.

2. The method of claim 1 wherein the pH of the recirculating cooling water system is within the range of 6–10.

3. The method of claim 2 wherein the water soluble polymer is a water soluble polymer or copolymer of (meth) acrylic acid or its alkali metal salts.

4. The method of claim 3 wherein the water soluble persulfate salt is selected from the group consisting of ammonium and alkali metal persulfates.

5. The method of claim 4 wherein the water contained in the recirculating cooling water system has a hardness of greater than 100 mg/liter expressed as $CaCO_3$.

6. The method of claim 4 wherein the water contained in the recirculating cooling water system has a hardness of greater than about 200 mg/liter expressed as $CaCO_3$.

7. The method of claim 2 wherein the water soluble polymer is a copolymer of acrylic acid and acrylamide.

8. The method of claim 7 wherein the water soluble persulfate salt is sodium persulfate.

9. A method for reducing the deposit of polymer scale on the heat transfer surfaces of a recirculating cooling water system containing water having at least 100 ppm of hardness calculated as $CaCO_3$, which cooling water system uses boiler blowdown water from a boiler water system treated with a water soluble polymeric scale inhibitor as a make-up water source, which method comprises the steps of:

a) adding to the boiler blowdown water containing the water soluble polymeric scale inhibitor from 0.01 to 10 parts by weight of a water soluble persulfate salt selected from the group consisting of ammonium and alkali metal persulfate salts, per each part by weight of polymer contained in the water;

b) reacting the persulfate salt with the water soluble polymeric scale inhibitor contained in the water for a sufficient period of time to reduce the molecular weight of the water soluble polymeric scale inhibitor; and then, c) adding the water as make-up water to said recirculating cooling water system wherein the amount of polymer scale deposit formed on the heat transfer surfaces of the recirculating cooling water system is reduced.

10. The method of claim 9 wherein the water soluble polymeric scale inhibitor is a polymer or copolymer of (meth)acrylic acid or its alkali metal salts and the pH of the water contained in the recirculating cooling water system is within the range of 6–10.

11. The method of claim 9 wherein the water soluble polymeric scale inhibitor is a copolymer of acrylic acid and acrylamide.

* * * * *